US 8,584,578 B2

(12) United States Patent
Koopman et al.

(10) Patent No.: US 8,584,578 B2
(45) Date of Patent: Nov. 19, 2013

(54) PREPARING DEVICE

(75) Inventors: Carlos Nicolaas Jozef Maria Koopman, Heerhugowaard (NL); Ramon Eduard Verhoeven, Heerhugowaard (NL); Eric Michaël Cornelis Maria Van Eijnatten, Obdam (NL)

(73) Assignee: Bravilor Holding B.V., Heerhugowaard (NL)

( * ) Notice: Subject to any disclaimer, the term of this patent is extended or adjusted under 35 U.S.C. 154(b) by 1042 days.

(21) Appl. No.: 12/439,359

(22) PCT Filed: Sep. 6, 2007

(86) PCT No.: PCT/NL2007/050436
§ 371 (c)(1),
(2), (4) Date: Sep. 14, 2009

(87) PCT Pub. No.: WO2008/030095
PCT Pub. Date: Mar. 13, 2008

(65) Prior Publication Data
US 2010/0018406 A1  Jan. 28, 2010

(30) Foreign Application Priority Data

Sep. 7, 2006 (NL) ...................... 2000218

(51) Int. Cl.
*A47J 31/057* (2006.01)
(52) U.S. Cl.
USPC .............................. 99/300; 99/287
(58) Field of Classification Search
USPC ........ 99/300, 287; 366/64, 168.1, 165.3, 134; 222/235, 129.1
See application file for complete search history.

(56) References Cited

U.S. PATENT DOCUMENTS 3,132,123 A   5/1964   Harris, Jr. et al.
3,536,683 A   10/1970  Bailor et al.
(Continued)

FOREIGN PATENT DOCUMENTS

CA   1002223   12/1976
DE   1936411   1/1971
(Continued)

OTHER PUBLICATIONS

International Search Report for PCT/NL2007/050436, dated Jan. 14, 2008, 2 pages.

*Primary Examiner* — Gene Kim
*Assistant Examiner* — M Chambers
(74) *Attorney, Agent, or Firm* — Gilberto M. Villacorta; Sunit Talapatra; Foley & Lardner LLP

(57) ABSTRACT

The present invention relates to a preparing device (1) for preparing an aqueous beverage by means of a beverage ingredient. The preparing device (1) comprises: an outflow nozzle (33) for dispensing prepared beverage; a preparation chamber (13, 16, 14) for at least partially preparing the beverage; a supply (12) line ending in the preparation chamber for the supply of water to the preparation chamber; an ingredient-dispensing system (7) for delivering the beverage ingredient to the preparation chamber; and an outflow path (36, 33) which extends from the preparation chamber to the outflow nozzle. The outflow nozzle (33) and/or the preparation chamber (13, 16, 14) and/or the outflow path (33, 36) are entirely or partly made from a polymer mixture which comprises (a) a self-lubricating, hydrophobic polymer or copolymer having a moisture absorption, determined in accordance with ASTM D 570 at a relative humidity of 50% and a temperature of 23° C., of less than 1% and (b) a homopolymer or a copolymer of a fluorinated ethylene.

11 Claims, 3 Drawing Sheets

(56) References Cited

U.S. PATENT DOCUMENTS

| | | |
|---|---|---|
| 3,598,139 A | 8/1971 | Opladen et al. |
| 3,980,734 A | 9/1976 | Karlheinz et al. |
| 4,530,972 A | 7/1985 | Masayoshi et al. |
| 4,624,395 A * | 11/1986 | Baron et al. ............... 222/129.1 |
| 5,203,474 A * | 4/1993 | Haynes ...................... 222/129.1 |
| 5,306,772 A * | 4/1994 | Mimura et al. ............. 525/92 A |
| 5,392,694 A * | 2/1995 | Muller et al. .................... 99/295 |
| 5,936,030 A | 8/1999 | Vaughan et al. |
| 6,095,032 A * | 8/2000 | Barnett et al. .................. 99/286 |
| 6,458,046 B1 | 10/2002 | Halko |
| 6,784,257 B2 * | 8/2004 | Hilgers et al. ................ 525/420 |
| 6,840,158 B2 * | 1/2005 | Cai ............................... 99/323.1 |
| 7,059,498 B2 * | 6/2006 | Ufheil et al. .................... 222/190 |
| 7,770,512 B2 * | 8/2010 | Albrecht ......................... 99/295 |
| 7,934,866 B2 * | 5/2011 | Koopman et al. ........... 366/165.3 |
| 8,235,581 B2 * | 8/2012 | Verhoeven et al. ........ 366/165.2 |
| 2004/0107841 A1 | 6/2004 | Cai |
| 2009/0324792 A1 * | 12/2009 | Verhoeven et al. ............ 426/519 |
| 2010/0018406 A1 * | 1/2010 | Koopman et al. ............... 99/300 |

FOREIGN PATENT DOCUMENTS

| | | |
|---|---|---|
| DE | 4432595 | 4/1996 |
| DE | 4445316 | 6/1996 |
| EP | 0475516 | 3/1992 |
| EP | 0508092 A2 * | 3/1992 |
| EP | 0724915 A1 | 8/1996 |
| EP | 1557734 | 7/2005 |
| GB | 1211496 | 11/1970 |
| GB | 1240040 | 7/1971 |
| GB | 1431586 | 4/1976 |
| GR | 3036952 T | 1/2002 |
| JP | 2067352 | 3/1990 |
| JP | 9067503 | 3/1997 |
| KR | 960009055 | 7/1996 |
| WO | WO-03/068039 A2 | 8/2003 |
| WO | WO 2006/014393 A1 | 2/2006 |

* cited by examiner

PREPARING DEVICE

FIELD OF THE INVENTION

The present invention relates to a preparing device for preparing an aqueous beverage by means of a beverage ingredient, in particular to a device for preparing instant beverages.

BACKGROUND OF THE INVENTION

A preparing device for preparing an aqueous beverage is, for example, a device for preparing instant beverages. An example thereof is known from WO 03/068039. With such instant beverage-preparing devices, liquid, such as hot water, is mixed in a mixing device with an instant ingredient, in the case of WO 03/068039 an instant powder. Referring to said example, WO 03/068039, such a mixing device has a preparation chamber in the form of a mixing chamber containing a rotor. The mixing chamber is usually subdivided into an inlet chamber and a rotor chamber. Instant powder is delivered to the mixing chamber by means of an ingredient-dispensing system. This system comprises an access opening at the top of the inlet chamber via which portions of instant powder are delivered to the inlet chamber. The inlet chamber has furthermore an inlet nozzle by means of which hot water is supplied by a supply line. Using a round inlet chamber and a radially oriented inlet, a mixing action is achieved in the inlet chamber due to the liquid making a circular movement. From the inlet chamber, the liquid with the instant powder passes to the rotor chamber where the rotor is situated. The rotor is usually arranged in such a manner that it rotates about a horizontal axis of rotation, as is also the case in WO 03/068039. As a result thereof, a pipe bend is usually provided between the inlet chamber and the rotor chamber. The rotor may perform various functions, optionally in combination, and may, partly for this reason, have various forms. One function is to improve the mixing. Another function is foaming up the beverage by mixing in air or by another way. Yet another function is a conveying function. Furthermore, an outflow path in the form of an outlet duct is connected to the mixing chamber, usually to the rotor chamber near the rotor, in order to discharge the mixture produced, generally into a container, such as a beaker, mug, cup or pot, from which the beverage can be drunk or poured. The outlet is generally horizontally oriented and has a discharge part at the end having an outflow nozzle which is directed downwards by means of a bend, also referred to as an outflow opening.

Another type of device for preparing an aqueous beverage is, for example, the type in which water is passed through a cartridge containing beverage ingredient or a bed of beverage ingredient. Consideration may be given here, for example, to espresso machines for preparing espresso coffee or filter coffee machines in which coffee powder is placed into a funnel-shaped paper filter and the water flows down through the bed on account of the force of gravity. Referring to systems which are currently commercially available, the following may be mentioned by way of example: the Tassimo® system by Kraft® which uses cartridges containing liquid concentrate; the Nespresso® system by Nestlé® which uses closed aluminium cups containing ground coffee powder; the systems operating at a pressure of 1-2.5 bar by Philips®/Sara Lee® (the Senseo® system), Bosch (Augusto®), Severin®, all of which use cartridges consisting of two layers of filter paper which are sealed together at the edge and which contain coffee powder or fannings of tea leaves. With devices of this type, a container is provided for accommodating the cartridge. This container or the cartridge itself delimits the preparation chamber. The ingredient-dispensing system in this case is usually provided in the preparation chamber. In the case of a bed of ground coffee, the ingredient-dispensing system may comprise, for example, a filter, such as a filter made from filter paper, as well as the bed of ground coffee itself. Furthermore, with devices of this type, it is known to subject the liquid flowing through the outflow path to further processing steps, such as foaming, or to add further ingredients to this path.

Mechanical parts, such as bearing bushes and toothed wheels, which comprise a mixture of polyoxymethylene, polytetrafluoroethylene and calcium carbonate are known from DE A 4.445.316. These parts have improved sliding properties and show little wear. The parts preferably contain 50-98 parts by weight of polyoxymethylene, 1-25 parts by weight of polytetrafluoroethylene and 1-25 parts by weight of calcium carbonate.

WO 2006/014393 discloses an aqueous coating composition, which comprises tetrafluoroethylene polymer particles and particles of a non-fluorinated polymer. The coating composition can be applied to a substrate such as glass, metal or stainless steel and provides coatings which are able to resist adhesion, wear and the effects of hot salt water very well.

US 2004/107841 discloses a device for preparing a coffee drink having an appealing creme layer comprises a container for receiving flavour-containing materials and allowing it to interact with pressurised hot water to produce a coffee drink.

The instant beverage-preparing devices known for preparing instant beverages have various shortcomings, that is to say there are various points which can be improved upon. One of the main shortcomings is the fact that water and/or moisture and/or instant ingredient, such as instant powder, is deposited on certain parts of the mixing device which is disadvantageous in connection with hygiene. As a result thereof, such mixing devices and the parts thereof have to be cleaned regularly. In this case, it would be advantageous if the frequency with which the mixing device or the parts thereof have to be cleaned could be reduced.

These disadvantages which occur with instant beverage-preparing devices also occur in the case of the above-described devices of the type where water is passed through a cartridge containing beverage ingredient or a bed of beverage ingredient. In this case, too, water and/or moisture and/or beverage ingredient is deposited.

Such deposits not only necessitate regular cleaning, but also prevent the use of the same parts for the preparation of different beverages. In order to prevent flavour contamination (that is to say transference of flavour constituents from one beverage to the other beverage), measures have to be taken, such as rinsing prior to preparing a different type of beverage.

It is therefore an object of the present invention to provide a preparing device for preparing an aqueous beverage by means of a beverage ingredient, in which deposits on parts through which the aqueous beverage flows or parts coming into contact with the aqueous beverage are prevented.

Another object of the present invention is to improve the hygienic conditions under which the aqueous beverage is prepared.

SUMMARY OF THE INVENTION

The present invention relates to a preparing device for preparing an aqueous beverage by means of a beverage ingredient, the preparing device comprising:
   an outflow nozzle for dispensing prepared beverage;
   a preparation chamber for at least partially preparing the beverage;

a supply line ending in the preparation chamber for the supply of water to the preparation chamber;

an ingredient-dispensing system for delivering the beverage ingredient to the preparation chamber; and an outflow path which extends from the preparation chamber to the outflow nozzle;

in which the outflow nozzle and/or the preparation chamber and/or the outflow path and/or the ingredient-dispensing system, at least parts thereof, and/or the supply line are entirely or partly made from a polymer mixture which comprises (a) a self-lubricating, hydrophobic polymer or copolymer having a moisture absorption, determined in accordance with ASTM D 570 at a relative humidity of 50% and a temperature of 23° C., of less than 1% and (b) a homopolymer or a copolymer of a fluorinated ethylene.

DETAILED DESCRIPTION OF THE INVENTION

Figure 1:
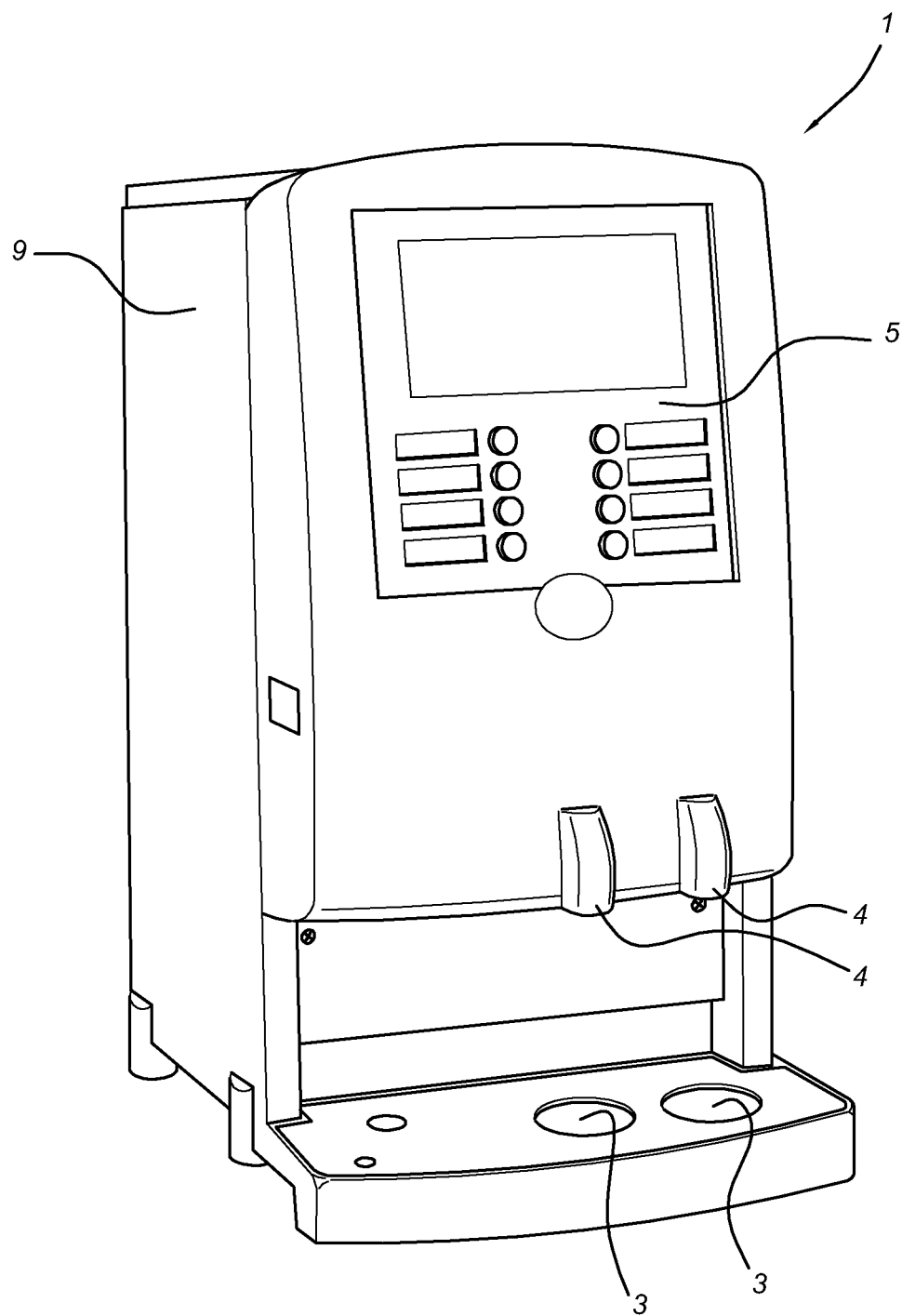
FIG. 1 diagrammatically shows a perspective view of a beverage-preparing device according to the invention.

According to the present invention, it is preferred that the self-lubricating hydrophobic polymer or copolymer has a moisture absorption, as determined in accordance with ASTM D 570 at a relative humidity of 50% and a temperature of 23° C., of less than 0.8%. It is furthermore preferred that the self-lubricating hydrophobic polymer or copolymer is a polyacetal. Such polymers are well-known in the prior art, see for example Kirk-Othmer, Encyclopedia of Chemical Technology, Volume 1, pp. 109-120 (1991) and Volume 9, pp. 536-537 (1994). The polyacetal is in particular a polyoxymethylene, in particular a homopolymer of formaldehyde.

According to the present invention, the homopolymer or the copolymer of the fluorinated ethylene preferably comprises a fluorinated ethylene of the formula: CXY=CXY, wherein X and Y are independently selected from the group consisting of hydrogen, fluorine and chlorine. If the homopolymer or copolymer is a so-called modified homopolymer or copolymer, X and Y may also be selected from the group consisting of linear or branched, $C_1$-$C_{10}$ polyfluoroalkyl, perfluoroalkyl, polyfluoroalkoxy and perfluoroalkoxy groups, which may optionally comprise one or more oxygen atoms. More preferably, X and Y are both fluorine. As comonomer, the copolymer furthermore preferably contains a linear or branched fluorinated $C_2$-$C_{12}$ alkene, preferably having 1-10 fluorine atoms, for example vinyl fluoride, vinylidene fluoride, and hexafluoropropene. The copolymer may comprise other alkenes and/or alkadienes, optionally substituted by one or more fluorine atoms and/or chlorine atoms. According to the invention, the polymer of the fluorinated ethylene is most preferably a homopolymer and is in particular polytetrafluoroethylene. According to the invention, it is preferred that the homopolymer or the copolymer of the fluorinated ethylene can be processed in the melt and that the melt viscosity is preferably lower than $10^{10}$ Pa·s.

According to the present invention, it is preferred that the polymer mixture comprises 1-99% by weight of the self-lubricating, hydrophobic polymer and 1-99% by weight of the homopolymer or the copolymer of the fluorinated ethylene, based on the total weight of the polymer mixture. More preferably, the polymer mixture comprises 70-95% by weight of the self-lubricating, hydrophobic polymer and 5-30% by weight of the homopolymer or the copolymer of the fluorinated ethylene, based on the total weight of the polymer mixture.

The polymer mixture preferably has a density of 1.3 to 1.6 g/cm$^3$ according to ISO 1183 and a melt flow rate $I_2$ (190° C., 2.16 kg, ISO 1183) of 1 to 50 cm$^3$/10 min. The water absorption is preferably lower than 0.8% (as determined in accordance with ASTM D 570 or ISO 62 at a relative humidity of 50% and a temperature of 23° C.), more preferably lower than 0.5% and in particular lower than 0.4%. The polymer mixture can preferably be processed in the melt, the melting point being lower than 250° C.

The present invention will be explained in more detail below with reference to an exemplary embodiment illustrated in the figures.

Figure 2:
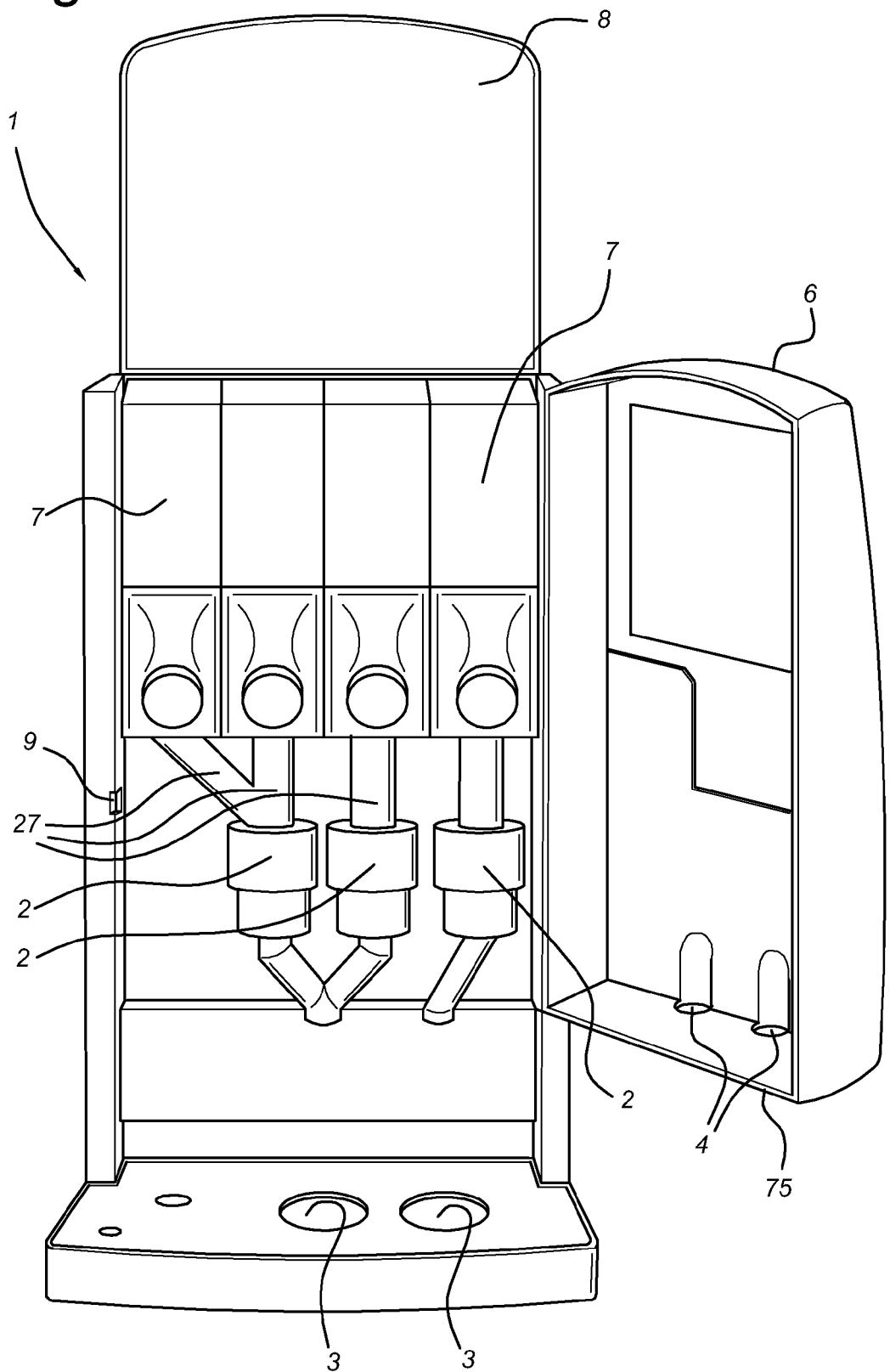
FIG. 2 diagrammatically shows a perspective view of the beverage-preparing device according to the invention in an open position.

FIGS. 1 and 2 diagrammatically show a beverage-preparing device 1 according to the invention in perspective. This beverage-preparing device comprises a substantially closed cabinet 9, a hinged cover 8, a hinged door 6. On the door 6, an operating panel 5 is provided, by means of which the user can make a selection from a range of beverages. At the front, at the bottom, two positioning locations 3 for a cup or mug are provided on a panel. Above each positioning location 3, a dispensing point 4 for the beverage is provided in the door 5.

When the door is open (cf. FIG. 2), four storage containers 7 can be seen. Each storage container may contain a different base material for preparing an instant beverage. Thus, for example, the left-hand container 7 may contain milk powder, the second container from the left instant coffee powder for cappuccino, the third container from the left instant coffee powder for standard or espresso coffee, and the right-hand container instant soup powder. The containers may also contain instant liquid instead of instant powder, and it is also possible for containers with instant powder to be provided in addition to containers with instant liquid.

Beneath the storage containers 7, there are three mixing devices according to the invention which are connected to the storage containers via powder supply ducts. It should be noted that a beverage-preparing device according to the invention may also be provided with fewer or more mixing devices according to the invention.

In accordance with standard NEN-EN-IEC60335-2-75, three so-called "areas" can be distinguished in the beverage-preparing device according to the invention, i.e. the so-called "user area" (article 3.109 of the standard), the so-called "maintenance area" (article 3.110 of the standard), and the so-called "service area" (article 3.111 of the standard).

The user area is the space where the user obtains the beverage. The user area is thus essentially the area which is accessible from the outside, as illustrated in FIG. 1.

The maintenance area is the space where the standard, usually daily, maintenance is carried out, in particular refilling the storage containers. In order to give access to the maintenance area, a hinged door 6 is provided at the front of the beverage-preparing device 1 and a hinged cover 8 is provided at the top of the beverage-preparing device 1. The hinged cover 8 can incidentally also be omitted.

The so-called service area is situated in the space enclosed by the cabinet-shaped frame 9. This service area is only accessible to technical maintenance personnel. The service area contains electrical parts, such as the power supply, electric motors, heating means, etc.

Figure 3:
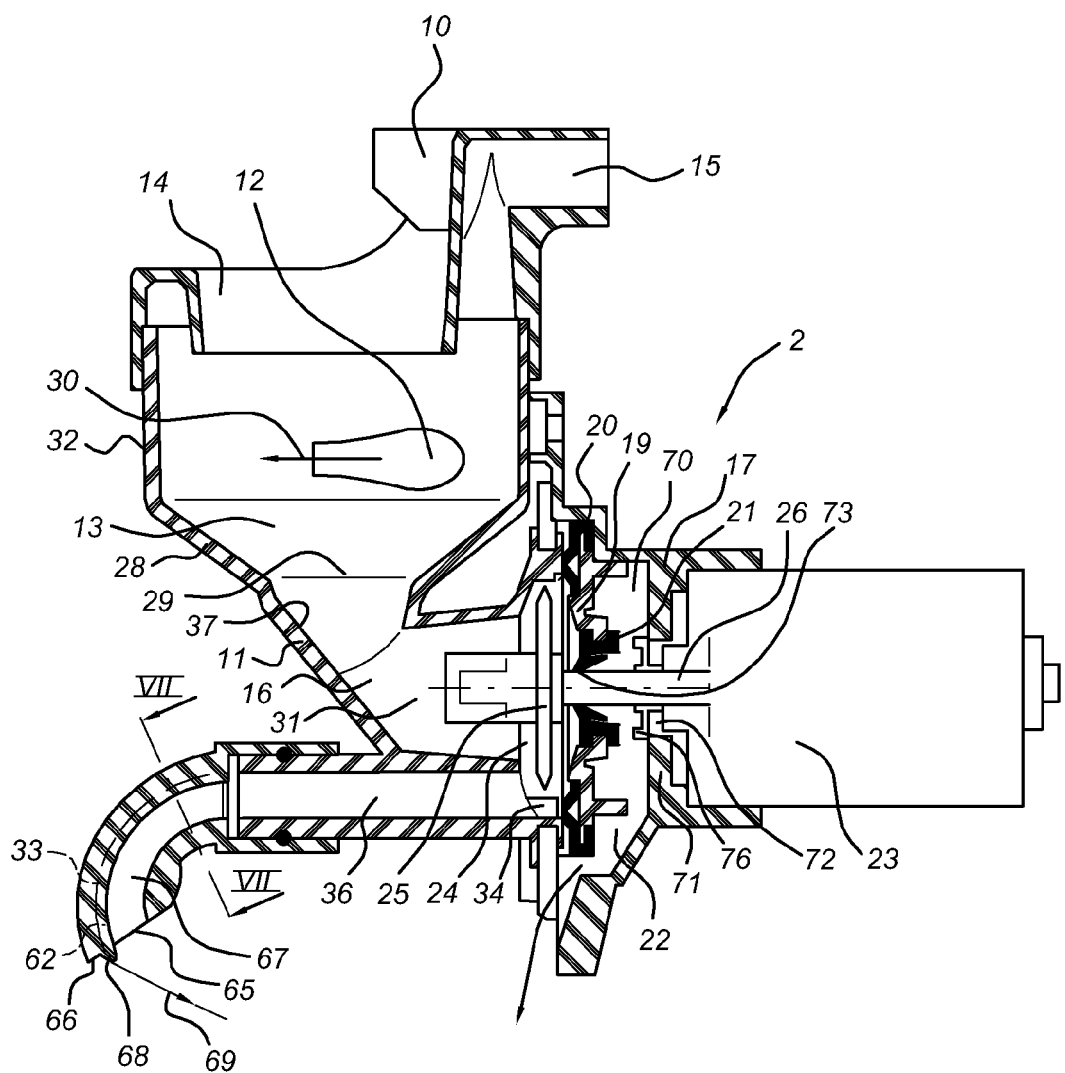
FIG. 3 diagrammatically shows a cross-sectional view of a mixing device according to the invention.

FIG. 3 shows a cross section of a mixing device of a preparing device according to the invention. This mixing device 2 will initially be discussed in general terms without yet going into detail about the invention itself.

The mixing device 2 comprises a preparation chamber in the form of a mixing chamber 13, 16, 14. The mixing chamber is subdivided into an inlet chamber 13, a rotor chamber 24 and a pipe bend 16 which connects the inlet chamber 13 to the rotor chamber 24. The rotor chamber 24 contains a rotor 25. The rotor 25 is driven by an electric motor 23, or electromotor for short. This electromotor 23 is placed outside the rotor chamber and connected to the rotor 25 by means of a drive shaft 26.

An extractor hood 10 is provided on the inlet chamber 13. This extractor hood 10 delimits an access opening 14 to the inlet chamber 13. The extractor hood 10 furthermore has a connection 15 for connecting to an extraction duct. As can be seen in FIG. 2, one or more powder supply ducts 27 ends in the access opening 14. In use, instant powder, or at least portions of instant powder, are supplied and delivered to the inlet chamber 13 via these powder supply ducts 27. In the inlet chamber 13, there is furthermore an inlet nozzle 12 for the supply of hot water. This hot water is supplied in the horizontal direction, in the direction indicated by arrow 30, via a supply line (the end of which is formed by the inlet nozzle) in order to flow out into the inlet chamber. Due to the fact that the inlet chamber is bowl-shaped, the hot water will thus carry out a swirling motion. The instant powder, which is fed into the inlet chamber via access opening 14, will consequently already be mixed with the hot water in the inlet chamber and be able to completely or partially dissolve in the process.

Due to the presence of the hot water, there will be vapour in the inlet chamber 13 and due to the presence of the instant powder, there will also be fine powder particles floating in the vapour in the inlet chamber 13. It will be clear that this vapour should not enter the powder supply ducts 27 and the extractor hood 10 has been provided for this very reason. In use, air will be extracted from the inlet chamber 13 via the connection 15, so that vapour and fine powder particles are removed to the surrounding area.

The bottom 28 of the inlet chamber 13 is of an, as it were, funnel design in order to end centrally at the inlet opening 29 of the pipe bend 16. This pipe bend 16 bends through approximately 90° in order to end at the outlet opening 31 of the pipe bend 16 in the rotor chamber 24.

The mixture undergoes further treatment by the rotor 25 in the rotor chamber 24. According to the present invention, this rotor can be of varying design. The rotor illustrated in FIG. 3 is substantially planar and disc-shaped. However, the rotor may also be of a different design, for example similar to the rotor of EP 639.924 A2 or similar to the rotor of WO 03/068039.

At the rear, the rotor chamber 24 is delimited by a rear wall 19, which is also referred to in this patent application by the term "first wall part". This first wall part 19 is provided with a shaft seal 21 through which the drive shaft 26 protrudes into the rotor chamber 24.

The rear wall 19 is accommodated in the motor support 17 which supports the electromotor 23. During fitting, the motor support 17 is attached to the front wall of the cabinet 9. The motor support 17 furthermore supports the housing 32 in which the mixing chamber is accommodated. The rear wall 19 is provided along the periphery with a flexible seal 20 against which a rib 34 of the mixing chamber housing 32 forms a seal.

The mixing chamber housing 32 is furthermore provided with an outlet duct 36, 33 for discharging the mixture formed in the mixing chamber 13, 16, 24. The outlet duct 36, 33 comprises a straight segment 36 and an outlet part 33 by means of which the mixture is dispensed in the cup or beaker. Referring to FIG. 2, it will be clear that a pipe or otherwise a duct may be provided between the straight segment 36 and the outlet 33 if the mixing device 2 is not provided perpendicularly above the positioning location.

Although the mixing device according to the invention has been described above as a mixing device for mixing an instant powder with a liquid, in particular water, it should be noted that the mixing device according to the invention may very well be of the type in which an instant liquid—in practice often referred to as 'liquid ingredient'—is mixed with water. The viscosity of such a liquid ingredient can, according to the invention, vary from low to high—and may even be extremely viscous. According to the present invention, such a liquid ingredient may, for example, be a concentrated extract or condensed liquid. It will be clear to the person skilled in the art that the supply to the mixing chamber may be designed differently in the case of a liquid ingredient. The extractor hood can be omitted completely (but can also remain in place). The shape of the inlet chamber may be different (but may also be approximately the same, if desired).

Furthermore, it should be noted that the mixing device according to the invention can be used for preparing both hot and cold beverages. According to the invention, hot beverages can be prepared both from instant powder and from an instant liquid, or so-called 'liquid ingredient'. The same applies to cold beverages. According to the invention, cold beverages can also be prepared both from an instant powder and from an instant liquid, or so-called 'liquid ingredient'.

Examples of beverages which may be prepared using a beverage-preparing device according to the invention include: tea, iced tea, frappé coffee (iced coffee), (cold) lemonade, soup, bouillon, (artificial) fruit juice, health drinks—such as AA-drink®. All of these beverages can in principle either be made using an instant powder or using an instant liquid—so-called 'liquid ingredient'—as desired.

According to the present invention, the storage containers 7 and/or the extractor hood 10 and/or the outlet 33 and/or a duct provided between the outlet 33 and straight segment 36 and/or the mixing chamber (preparation chamber) in the beverage-preparing device described with reference to FIGS. 1, 2 and 3 may entirely or partially be made from a material as defined in more detail in the claims of the present application, i.e. the polymer mixture comprising (a) a self-lubricating, hydrophobic polymer or copolymer having a moisture absorption, determined in accordance with ASTM D 570 at a relative humidity of 50% and a temperature of 23° C., of less than 1% and (b) a homopolymer or a copolymer of a fluorinated ethylene.

Furthermore, it will be clear that, according to the invention, a beverage-preparing device can also be understood to be a device as disclosed by, for example, GB 1.110.513, U.S. Pat. No. 4,739,697 and EP 904.718 A1. The funnel in which the filter paper bag of a preparing device such as that in GB 1.110.513 and U.S. Pat. No. 4,739,697 is placed may, according to the invention, be entirely or partially be made from a material as defined in more detail in the claims of the present application. According to the invention, the container bowl 16 and/or the outflow path 32, 30, 26 of a beverage-preparing device as disclosed by, for example EP 904.718 A1, may also be made entirely or partially from a material as defined in more detail in the claims of the present application, i.e. the polymer mixture comprising (a) a self-lubricating, hydrophobic polymer or copolymer having a moisture absorption, determined in accordance with ASTM D 570 at a relative humidity of 50% and a temperature of 23° C., of less than 1% and (b) a homopolymer or a copolymer of a fluorinated ethylene.

The invention claimed is:

1. A device for preparing an aqueous beverage by, comprising:
   (i) an outflow nozzle for dispensing a prepared beverage;
   (ii) a preparation chamber for at least partially preparing the beverage;
   (iii) a supply line connected to the preparation chamber for supplying an aqueous solution to the preparation chamber;
   (iv) an ingredient-dispensing system for delivering a beverage ingredient to the preparation chamber; and
   (v) an outflow path extending from the preparation chamber to the outflow nozzle;
   in which at least a portion of the outflow nozzle, the preparation chamber, and/or the outflow path, comprises a polymer mixture which comprises (a) 70-95% by weight of a polyoxymethylene and (b) 5-30% by weight of a polytetrafluoroethylene.

2. The device according to claim 1, in which the preparation chamber comprises a mixing chamber comprising a rotor.

3. The device according to claim 2, in which at least a portion of the rotor comprises a polymer mixture which comprises (a) a self-lubricating hydrophobic polymer or copolymer with a moisture absorption, determined in accordance with ASTM D 570 at a relative humidity of 50% and a temperature of 23° C., of less than 1%, and (b) a homopolymer or a copolymer of a fluorinated ethylene.

4. The device according to claim 2, in which the fluorinated ethylene has the formula $CXY=CXY$, wherein X and Y are independently selected from the group consisting of hydrogen, fluorine and chlorine.

5. The device according to claim 1, in which the aqueous solution comprises an instant ingredient.

6. The device according to claim 5, in which the instant ingredient is an instant powder or an instant liquid.

7. The device according to claim 1, in which the entire outflow nozzle, the preparation chamber, and/or the outflow path, comprises the polymer mixture.

8. The device according to claim 1, in which at least a portion of the outflow nozzle, the preparation chamber, and/or the outflow path is coated with the polymer mixture.

9. A method of preventing moisture and powdery material from adhering to a part of the device of claim 1, the method comprising coating at least a portion of a part of the device with a polymer mixture comprising (a) self-lubricating hydrophobic polymer or copolymer with a moisture absorption, determined in accordance with ASTM D 570 at a relative humidity of 50% and a temperature of 23° C., of less than 1% and (b) a homopolymer or a copolymer of a fluorinated ethylene.

10. The method according to claim 9, in which the part supplies or holds an aqueous liquid.

11. The method according to claim 9, in which the part is a storage container, an extractor hood, an outlet, a duct from the outlet, and/or a mixing chamber.

* * * * *

UNITED STATES PATENT AND TRADEMARK OFFICE
CERTIFICATE OF CORRECTION

PATENT NO. : 8,584,578 B2
APPLICATION NO. : 12/439359
DATED : November 19, 2013
INVENTOR(S) : Koopman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1266 days.

Signed and Sealed this
Twenty-second Day of September, 2015

Michelle K. Lee
*Director of the United States Patent and Trademark Office*